United States Patent
Sassa et al.

(10) Patent No.: US 10,689,030 B2
(45) Date of Patent: Jun. 23, 2020

(54) DRIVING ASSIST SYSTEM

(71) Applicant: AISIN SEIKI KABUSHIKI KAISHA, Kariya-shi, Aichi-ken (JP)

(72) Inventors: Koichi Sassa, Ichinomiya (JP); Hironori Hirata, Anjo (JP); Yoshihito Mizuno, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 61 days.

(21) Appl. No.: 16/002,283

(22) Filed: Jun. 7, 2018

(65) Prior Publication Data
US 2018/0354552 A1 Dec. 13, 2018

(30) Foreign Application Priority Data
Jun. 9, 2017 (JP) .................. 2017-114462

(51) Int. Cl.
| | |
|---|---|
| *B62D 6/10* | (2006.01) |
| *B60W 40/114* | (2012.01) |
| *B62D 15/02* | (2006.01) |
| *B62D 6/00* | (2006.01) |
| *B60W 40/072* | (2012.01) |

(52) U.S. Cl.
CPC .............. *B62D 6/10* (2013.01); *B60W 40/114* (2013.01); *B62D 6/002* (2013.01); *B62D 15/024* (2013.01); *B62D 15/027* (2013.01)

(58) Field of Classification Search
CPC ........ B62D 6/10; B62D 6/002; B62D 15/027; B62D 15/024; B62D 6/001; B62D 6/003; B62D 6/006; B62D 6/00; B62D 6/08; B62D 15/00; B62D 15/02; B62D 15/021; B60W 40/114; B60W 30/00; B60W 30/02; B60W 30/025; B60W 30/04; B60W 30/045; B60W 30/18145; B60W 30/18109; B60W 40/10; B60W 40/00
USPC .......................................... 701/41
See application file for complete search history.

(56) References Cited

U.S. PATENT DOCUMENTS

| | | | |
|---|---|---|---|
| 7,469,765 B2* | 12/2008 | Spannheimer | B62D 15/0285 180/204 |
| 9,738,315 B2* | 8/2017 | Yoon | B60R 1/00 |
| 2002/0041239 A1* | 4/2002 | Shimizu | B60R 1/00 340/932.2 |
| 2003/0201131 A1* | 10/2003 | Maekawa | B60K 17/35 180/249 |
| 2004/0230361 A1* | 11/2004 | Oshima | B62D 7/1509 701/69 |

(Continued)

FOREIGN PATENT DOCUMENTS

JP 2010-269707 A 12/2010

*Primary Examiner* — Angelina Shudy
*Assistant Examiner* — Mohamed Abdo Algehaim
(74) *Attorney, Agent, or Firm* — Sughrue Mion, PLLC

(57) ABSTRACT

A driving assist system includes: a first detection unit configured to detect first rotational information that is information about rotation of a left wheel of a vehicle; a second detection unit configured to detect second rotational information that is information about rotation of a right wheel of the vehicle; and a processing unit configured to estimate a running turning radius of a running turning circle on a running route on which the vehicle drives from the first rotational information and the second rotational information.

5 Claims, 9 Drawing Sheets

(56) References Cited

U.S. PATENT DOCUMENTS

| | | | |
|---|---|---|---|
| 2005/0049766 A1* | 3/2005 | Tanaka | B62D 15/0285 701/36 |
| 2007/0083308 A1* | 4/2007 | Hara | B62D 15/024 701/41 |
| 2007/0146166 A1* | 6/2007 | Sato | B62D 15/028 340/932.2 |
| 2007/0265750 A1* | 11/2007 | Goto | B62D 5/008 701/41 |
| 2008/0091320 A1* | 4/2008 | Sakai | B62D 1/286 701/42 |
| 2010/0156671 A1* | 6/2010 | Lee | B62D 15/027 340/932.2 |
| 2010/0250068 A1* | 9/2010 | Yamazaki | B62D 6/001 701/41 |
| 2012/0041658 A1* | 2/2012 | Turner | B62D 15/0215 701/68 |
| 2012/0046835 A1* | 2/2012 | Matsumoto | B60L 15/2036 701/41 |
| 2013/0151060 A1* | 6/2013 | Lee | B62D 15/0285 701/25 |
| 2015/0025732 A1* | 1/2015 | Min | B62D 15/0285 701/23 |
| 2015/0151784 A1* | 6/2015 | Moretti | B62D 15/024 701/41 |
| 2015/0291031 A1* | 10/2015 | Morimoto | B60W 50/12 701/70 |
| 2016/0001811 A1* | 1/2016 | Endo | B62D 5/0466 701/41 |
| 2016/0075374 A1* | 3/2016 | Yamashita | B62D 15/027 701/41 |
| 2016/0257303 A1* | 9/2016 | Lavoie | B60W 10/20 |
| 2018/0001928 A1* | 1/2018 | Lavoie | B62D 13/06 |
| 2018/0134152 A1* | 5/2018 | Nagayama | B60K 17/02 |
| 2018/0208199 A1* | 7/2018 | Fujita | G08G 1/00 |
| 2019/0027042 A1* | 1/2019 | Fujishima | B60W 30/06 |
| 2019/0084570 A1* | 3/2019 | Suzuki | B60W 40/068 |
| 2019/0092388 A1* | 3/2019 | Raad | B62D 13/005 |
| 2019/0161121 A1* | 5/2019 | Greenwood | B62D 15/0285 |
| 2019/0210638 A1* | 7/2019 | Ueno | B62D 5/04 |
| 2019/0359250 A1* | 11/2019 | Isshiki | B62D 5/0463 |

* cited by examiner

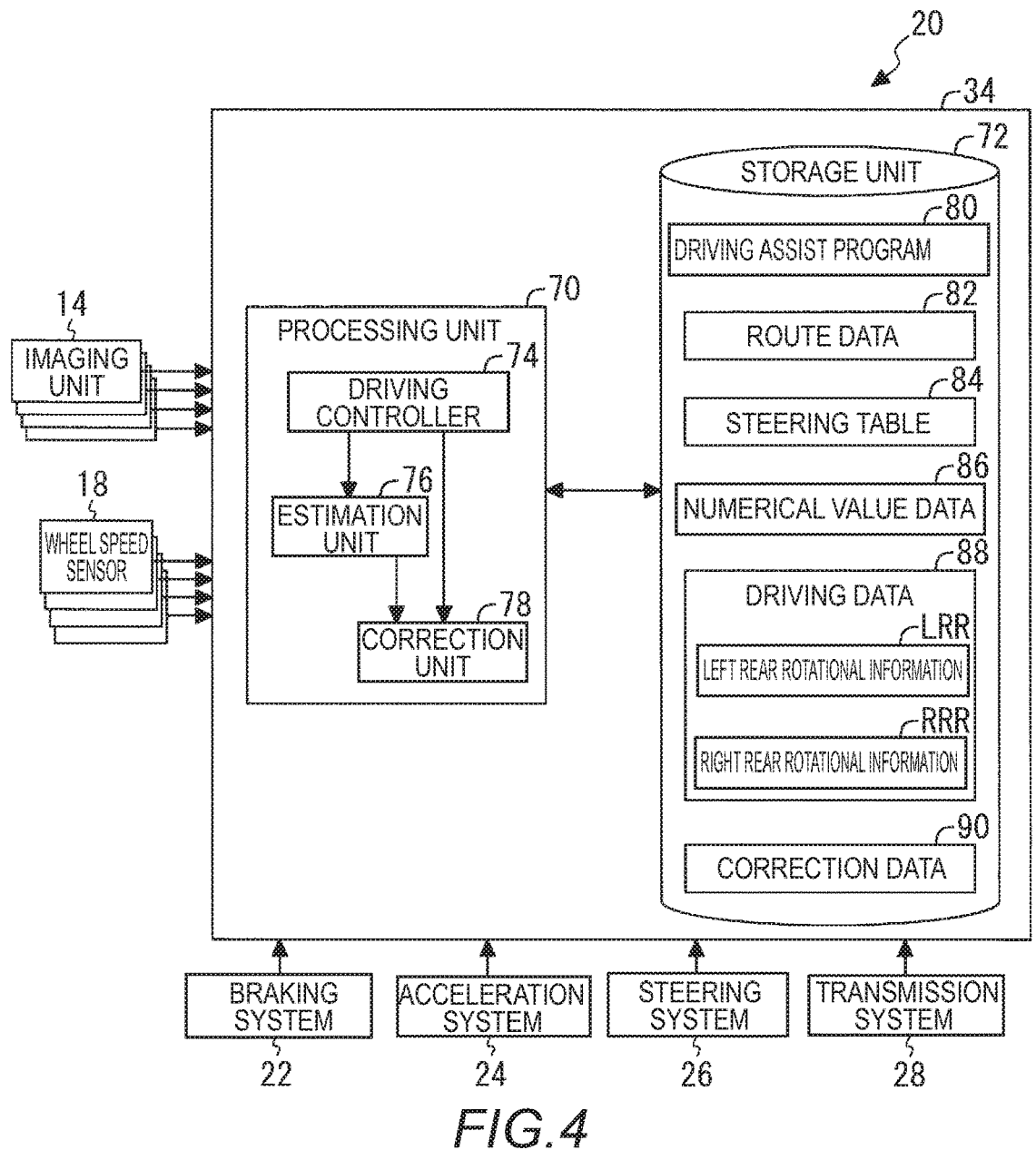

DRIVING ASSIST SYSTEM

CROSS REFERENCE TO RELATED APPLICATIONS

This application is based on and claims priority under 35 U.S.C. § 119 to Japanese Patent Application 2017-114462, filed on Jun. 9, 2017, the entire contents of which are incorporated herein by reference.

TECHNICAL FIELD

This disclosure relates to a driving assist system.

BACKGROUND DISCUSSION

There has been known a system that assists driving by automatic driving or the like during driving, such as parking of a vehicle. In such a system, the vehicle is controlled based on the turning radius of the vehicle, which is stored in advance in association with the steering angle of a steering unit, such as a steering wheel, in a storage device or the like. See, for example, JP 2010-269707 A (Reference 1).

However, a vehicle may drive with a turning radius different from the turning radius, which is associated in advance with the steering angle based on characteristics of each vehicle, etc. In this case, the turning radius of the running route, on which the vehicle actually drives, may not be estimated with high accuracy.

Thus, a need exists for a driving assist system which is not susceptible to the drawback mentioned above.

SUMMARY

A driving assist system according to an aspect of this disclosure includes a first detection unit configured to detect first rotational information that is information about rotation of a left wheel of a vehicle, a second detection unit configured to detect second rotational information that is information about rotation of a right wheel of the vehicle, and a processing unit configured to estimate a running turning radius of a running turning circle on a running route on which the vehicle drives from the first rotational information and the second rotational information.

BRIEF DESCRIPTION OF THE DRAWINGS

The foregoing and additional features and characteristics of this disclosure will become more apparent from the following detailed description considered with the reference to the accompanying drawings, wherein:

FIG. 3 is a functional block diagram for explaining functions of a driving assist device;

FIG. 4 is a view illustrating an example of a steering table;

DETAILED DESCRIPTION

Figure 1:
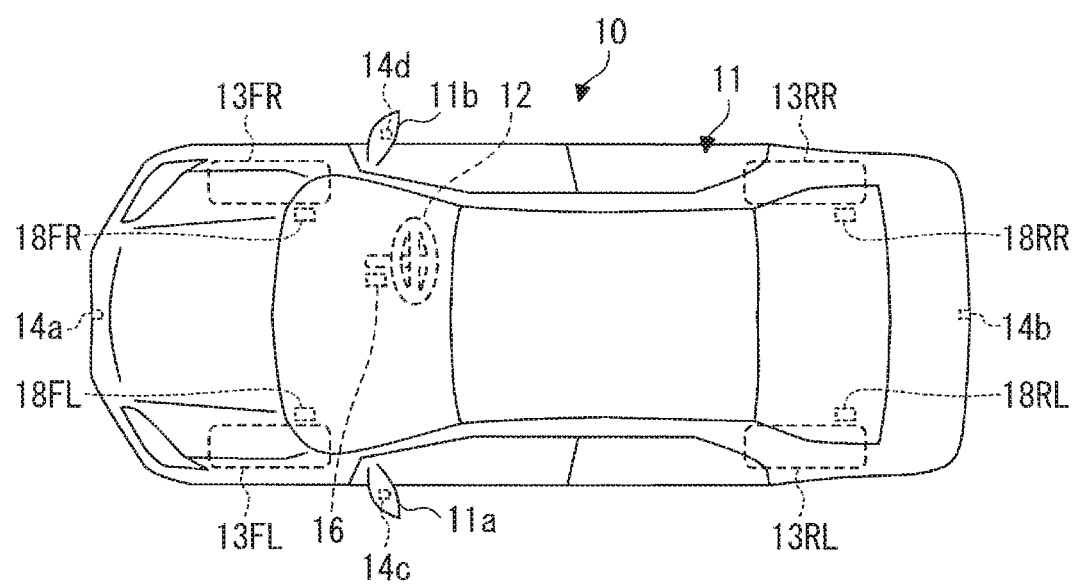
FIG. 1 is a plan view of a vehicle equipped with a parking assist system according to an embodiment.

Hereinafter, the same reference numerals will be given to the same constituent elements of following exemplary embodiments, etc., and a repeated description thereof will be appropriately omitted.

Embodiment

FIG. 1 is a plan view of a vehicle 10 equipped with a parking assist system according to an embodiment. The vehicle 10 may be, for example, an automobile (i.e., an internal combustion engine automobile) that uses an internal combustion engine (engine, not illustrated) as a drive source, an automobile (i.e., an electric automobile or a fuel cell automobile) that uses an electric motor (motor, not illustrated) as a drive source, or an automobile (i.e., a hybrid automobile) that uses both of them as a drive source. In addition, the vehicle 10 may be equipped with any of various transmission devices, and may also be equipped with various devices (e.g., systems and elements) required for driving the internal combustion engine or the electric motor (motor). In addition, for example, the type, number, and layout of devices associated with the driving of wheels 13 in the vehicle 10 may be set in various ways.

As illustrated in FIG. 1, the vehicle 10 includes a vehicle body 11, a steering unit 12, four wheels 13FL, 13FR, 13RL and 13 RR, one or a plurality of (four in the present embodiment) imaging units 14a, 14b, 14c and 14d, a steering unit sensor 16, and a plurality of (four in the present embodiment) wheel speed sensors 18FL, 18FR, 18RL and 18RR. When it is not necessary to distinguish the wheels 13FL, 13FR, 13RL and 13 RR, they are described as wheels 13. When it is not necessary to distinguish the imaging units 14a, 14b, 14c and 14d, they are described as imaging units 14. When it is not necessary to distinguish the wheel speed sensors 18FL, 18FR, 18RL and 18RR, they are described as wheel speed sensors 18.

The vehicle body 11 configures a vehicle room in which an occupant rides. The vehicle body 11 therein accommodates or holds the wheels 13, the steering unit 12, the imaging units 14, the steering unit sensor 16, the wheel speed sensors 18, for example.

The steering unit 12 includes, for example, a handle or a steering wheel, and is a device that operates steerable wheels (e.g., wheels 13FL and 13FR) of the vehicle 10.

The wheel 13FL is provided on the left front side of the vehicle 10. The wheel 13FR is provided on the right front side of the vehicle 10. The wheel 13RL is provided on the left rear side of the vehicle 10. The wheel 13RR is provided on the right rear side of the vehicle 10. Two front wheels 13FL and 13FR are steered by the steering unit 12, and function as steerable wheels that change the heading direction of the vehicle 10. Two rear wheels 13RL and 13RR function as driving wheels that are rotated by a driving force from, for example, an engine or a motor.

The imaging units 14 are, for example, digital cameras that incorporate imaging elements such as a charge coupled device (CCD) or a CMOS Image Sensor (CIS). The imaging units 14 output data of a still image or a moving image including a plurality of frame images generated at a predetermined frame rate as data of a captured image. Each imaging unit 14 includes a wide-angle lens or a fish-eye lens, and is capable of imaging a range from 140° to 190° in the horizontal direction. The optical axis of the imaging unit 14 is set obliquely downward. Thus, the imaging units 14 output data of a captured image obtained by capturing the surroundings of the vehicle 10 including the surrounding road surface.

The imaging units 14 are provided around the vehicle body 11. For example, the imaging unit 14a is provided on a center portion (e.g., a front bumper) in the transverse direction of a front end portion of the vehicle body 11. The imaging unit 14a generates a captured image obtained by capturing the surroundings at the front side of the vehicle 10. The imaging unit 14b is provided on a center portion (e.g., a rear bumper) in the transverse direction of a rear end portion of the vehicle body 11. The imaging unit 14b generates a captured image obtained by capturing the surroundings at the rear side of the vehicle 10. The imaging unit 14c is provided on a center portion (e.g., a left side mirror 11a) in the longitudinal direction of a left end portion of the vehicle body 11. The imaging unit 14c generates a captured image obtained by capturing the surroundings at the left side of the vehicle 10. The imaging unit 14d is provided on a center portion (e.g., a right side mirror 11b) in the longitudinal direction of a right end portion of the vehicle body 11. The imaging unit 14d generates a captured image obtained by capturing the surroundings at the rear side of the vehicle 10.

The steering unit sensor 16 is provided in the vicinity of the steering unit 12. The steering unit sensor 16 is an angle sensor including, for example, a hall element, and outputs a detected rotation angle of the steering unit 12 as a detected steering angle.

The wheel speed sensors 18 include hall elements provided in the vicinity of the respective wheels 13, and are sensors that detect the amount of rotation or the number of revolutions per minute of the wheels 13.

The wheel speed sensor 18FL is provided in the vicinity of the left front wheel 13FL. The wheel speed sensor 18FL detects a wheel speed pulse related to the amount of rotation or the number of revolutions per minute of the wheel 13FL, and outputs the same as left front rotational information that is information about the rotation of the wheel 13FL.

The wheel speed sensor 18FR is provided in the vicinity of the right front wheel 13FR. The wheel speed sensor 18FR detects a wheel speed pulse related to the amount of rotation or the number of revolutions per minute of the wheel 13FR, and outputs the same as right front rotational information that is information about the rotation of the wheel 13FR.

The wheel speed sensor 18RL is an example of a first detection unit and is provided in the vicinity of the left rear wheel 13RL. The wheel speed sensor 18RL detects a wheel speed pulse related to the amount of rotation or the number of revolutions per minute of the wheel 13RL, and outputs the same as left rear rotational information that is information about the rotation of the wheel 13RL. The left rear rotational information is an example of first rotational information.

The wheel speed sensor 18RR is an example of a second detection unit and is provided in the vicinity of the right rear wheel 13RR. The wheel speed sensor 18RR detects a wheel speed pulse related to the amount of rotation or the number of revolutions per minute of the wheel 13RR, and outputs the same as right rear rotational information that is information about the rotation of the wheel 13RR. The right rear rotational information is an example of second rotational information.

Figure 2:
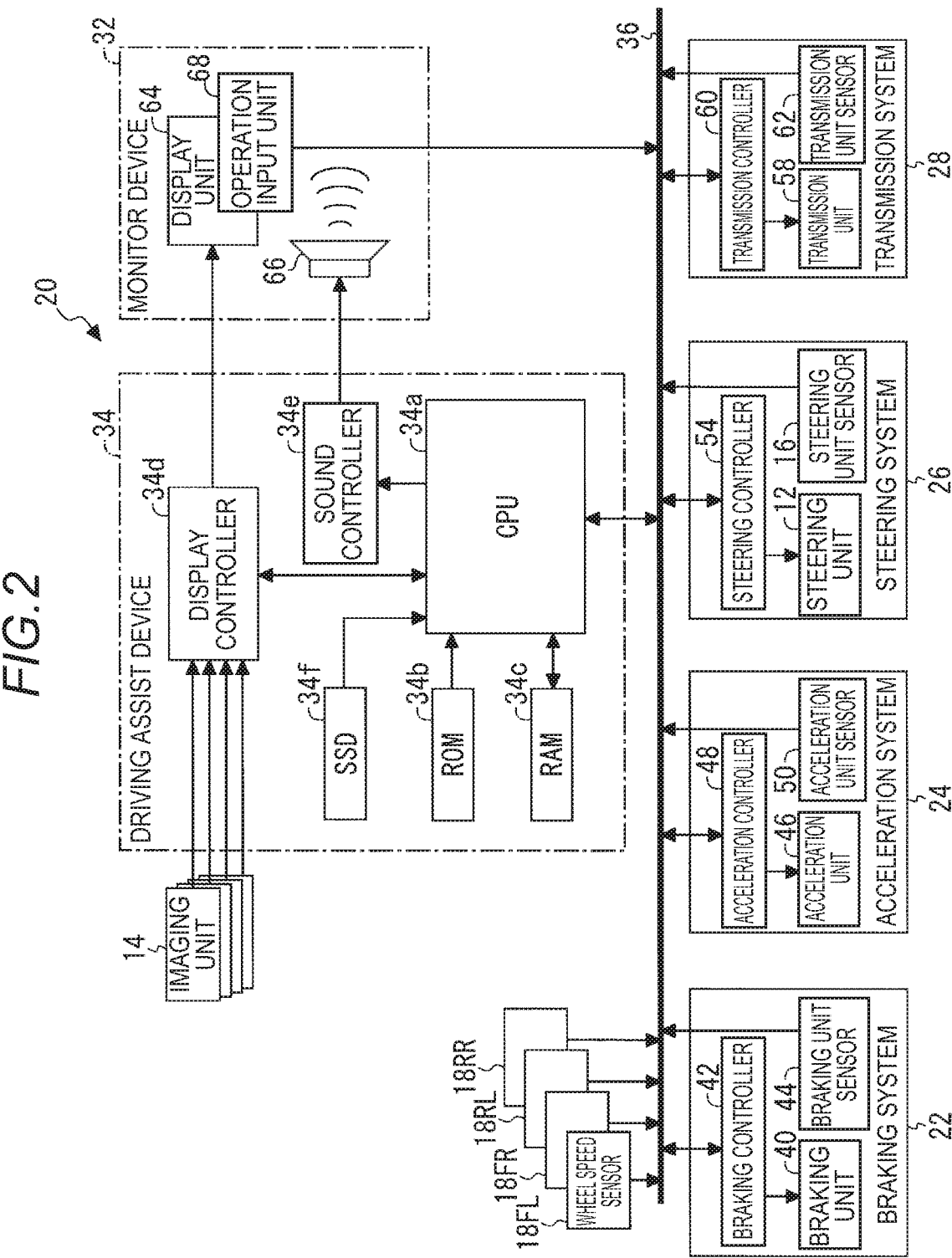
FIG. 2 is a block diagram illustrating an overall configuration of a driving assist system according to an embodiment.

FIG. 2 is a block diagram illustrating an overall configuration of a driving assist system 20 according to an embodiment. The driving assist system 20 is mounted in the vehicle 10 to assist a driver by automatically driving the vehicle 10 (including partial automatic driving). In addition, the driving assist system 20 corrects the steering angle of the steering unit 12 during automatic driving, so that a running route RR that is an actual route in automatic driving approaches a set route.

As illustrated in FIG. 2, the driving assist system 20 includes the imaging units 14, the wheel speed sensors 18, a braking system 22, an acceleration system 24, a steering system 26, a transmission system 28, a monitor device 32, a driving assist device 34, and an in-vehicle network 36.

The imaging units 14 output captured images obtained by capturing the surroundings of the vehicle 10 to the driving assist device 34.

The wheel speed sensors 18 output detected rotational information to the in-vehicle network 36.

The braking system 22 controls deceleration of the vehicle 10. The braking system 22 includes a braking unit 40, a braking controller 42, and a braking unit sensor 44.

The braking unit 40 includes, for example, a brake and a brake pedal, and is a device for decelerating the vehicle 10.

The braking controller 42 is, for example, a computer including a microcomputer, such as an electronic control unit (ECU) having a hardware processor such as a central processing unit (CPU). The braking controller 42 controls the braking unit 40 to control the deceleration of the vehicle 10 based on an instruction from the driving assist device 34.

The braking unit sensor 44 is, for example, a position sensor, and detects a position of the braking unit 40 when the braking unit 40 is a brake pedal. The braking unit sensor 44 outputs the detected state of the braking unit 40 to the in-vehicle network 36.

The acceleration system 24 controls acceleration of the vehicle 10. The acceleration system 24 includes an acceleration unit 46, an acceleration controller 48, and an acceleration unit sensor 50.

The acceleration unit 46 includes, for example, an accelerator pedal, and is a device for accelerating the vehicle 10.

The acceleration controller 48 is, for example, a computer including a microcomputer, such as an ECU having a hardware processor such as a CPU. The acceleration controller 48 controls the acceleration unit 46 to control the acceleration of the vehicle 10 based on an instruction from the driving assist device 34.

The acceleration unit sensor 50 is, for example, a position sensor, and detects a position of the acceleration unit 46 when the acceleration unit 46 is an accelerator pedal. The acceleration unit sensor 50 outputs the detected state of the acceleration unit 46 to the in-vehicle network 36.

The steering system 26 controls the heading direction of the vehicle 10. The steering system 26 includes a steering unit 12, a steering controller 54, and the steering unit sensor 16.

The steering controller 54 is, for example, a computer including a microcomputer, such as an ECU having a hardware processor such as a CPU. The steering controller 54 controls the steering unit 12 to control the heading direction of the vehicle 10 based on an instruction steering angle from the driving assist device 34.

The steering unit sensor 16 outputs a detected steering angle of the steering unit 12 to the in-vehicle network 36.

The transmission system 28 controls the gear ratio of the vehicle 10. The transmission system 28 includes a transmission unit 58, a transmission controller 60, and a transmission unit sensor 62.

The transmission unit 58 includes, for example, a shift lever, and is a device that changes the gear ratio of the vehicle 10.

The transmission controller 60 is, for example, a computer including a microcomputer, such as an ECU having a hardware processor such as a CPU. The transmission controller 60 controls the transmission unit 58 to control the gear ratio of the vehicle 10, for example, based on an instruction from the driving assist device 34.

The transmission unit sensor 62 detects a position of the transmission unit 58, such as Drive, Parking, or Reverse. The transmission unit sensor 62 outputs the detected position of the transmission unit 58 to the in-vehicle network 36.

The monitor device 32 is provided on, for example, a dashboard in the room of the vehicle 10. The monitor device 32 includes a display unit 64, a sound output unit 66, and an operation input unit 68.

The display unit 64 displays an image based on image data transmitted by the driving assist device 34. The display unit 64 is, for example, a display device, such as a liquid crystal display (LCD) or an organic electroluminescent (EL) display (OLED). The display unit 64 displays, for example, an image of a parking frame for receiving switching from manual driving to automatic driving.

The sound output unit 66 outputs sound based on sound data transmitted by the driving assist device 34. The sound output unit 66 is, for example, a speaker. The sound output unit 66 outputs, for example, sound regarding guidance for automatic driving.

The operation input unit 68 receives an input from an occupant. The operation input unit 68 is, for example, a touch panel. The operation input unit 68 is provided on a display screen of the display unit 64. The operation input unit 68 is configured to enable penetration of the image displayed by the display unit 64. Thus, the operation input unit 68 may allow the occupant to view the image displayed on the display screen of the display unit 64. The operation input unit 68 receives, for example, an instruction regarding parking assist, which is input when the occupant touches a position corresponding to the image displayed on the display screen of the display unit 64, and transmits the instruction to the driving assist device 34. In addition, the operation input unit 68 is not limited to the touch panel, and may be a hard switch such as a push button.

The driving assist device 34 is a computer including a microcomputer such as an electronic control unit (ECU). The driving assist device 34 acquires data of captured images from the imaging units 14. The driving assist device 34 transmits data regarding an image or sound generated based on, for example, the captured images to the monitor device 32. The driving assist device 34 transmits data regarding an image or sound, such as an instruction to the driver and a notification to the driver, to the monitor device 32. The driving assist device 34 controls the respective systems 22, 24, 26 and 28 via the in-vehicle network 36 to assist driving such as parking by automatically driving the vehicle 10. The driving assist device 34 includes a central processing unit (CPU) 34a, a read only memory (ROM) 34b, a random access memory (RAM) 34c, a display controller 34d, a sound controller 34e, and a solid state drive (SSD) 34f. The CPU 34a, the ROM 34b, and the RAM 34c may be integrated in the same package.

The CPU 34a is an example of a hardware processor, and reads a program stored in a nonvolatile storage device such as the ROM 34b to execute various calculation processing and control based on the corresponding program. For example, the CPU 34a executes a processing of an image, such as driving assist image, displayed on the display unit 64.

The ROM 34b stores, for example, each program and parameters required for executing the program. The RAM 34c temporarily stores various data used in calculation by the CPU 34a. The display controller 34d mainly executes, for example, an image processing of an image obtained by the imaging unit 14 or data conversion of a display image to be displayed on the display unit 64, among the calculation processing by the driving assist device 34. The sound controller 34e mainly executes a processing of sound output by the sound output unit 66, among the calculation processing by the driving assist device 34. The SSD 34f is a rewritable nonvolatile storage device, and preserves data even when a power supply of the driving assist device 34 is turned off.

The in-vehicle network 36 is connected to the wheel speed sensors 18, the braking system 22, the acceleration system 24, the steering system 26, the transmission system 28, the operation input unit 68 of the monitor device 32, and the driving assist device 34 so as to transmit and receive information mutually.

FIG. 3 is a functional block diagram for explaining functions of the driving assist device 34. As illustrated in FIG. 3, the driving assist device 34 includes a processing unit 70 and a storage unit 72.

The processing unit 70 is realized, for example, as a function of the CPU 34a. The processing unit 70 includes a driving controller 74, an estimation unit 76, and a correction unit 78. For example, the processing unit 70 may realize functions of the driving controller 74, the estimation unit 76, and the correction unit 78 by reading a driving assist program 80 stored in the storage unit 72. One or all of the driving controller 74, the estimation unit 76, and the correction unit 78 may be configured by hardware such as a circuit including an application specific integrated circuit (ASIC).

In driving assist by automatic driving, the driving controller 74 sets a set route to a target point LTP, which is set in a parking area or the like based on route data 82 including information about a plurality of route patterns or the like. For example, the driving controller 74 sets a set route including a part of a turning circle (hereinafter referred to as "set turning circle"). Hereinafter, the radius of the turning circle is referred to as a set turning radius. The driving controller 74 controls any one of the systems 22, 24, 26, and 28 to allow the vehicle 10 to drive along the set route.

More specifically, the driving controller 74 steers the wheels 13FL and 13FR by steering the steering unit 12 so as to correspond to the set turning radius based on a preset steering table 84. The steering table 84 is a table in which a target steering angle and the set turning radius are associated with each other in advance. The target steering angle is a steering angle of the steering unit 12 that is a target for driving the vehicle 10 along the set turning circle having the set turning radius. Thus, the driving controller 74 outputs an instruction steering angle to the steering system 26 to control the steering unit 12 so that the steering angle of the steering unit 12 reaches the target steering angle associated with the set turning radius. Thus, the driving controller 74 allows the vehicle 10 to drive along the set turning circle on the set route.

The driving controller 74 acquires, for example, rotational information LRR and RRR from the wheel speed sensors 18 via the in-vehicle network 36. The driving controller 74 controls the timing of steering of the steering unit 12, the timing of acceleration of the acceleration system 24, or the like based on a movement distance or the like calculated from the rotational information LRR and RRR. Thereby, the driving controller 74 allows the vehicle 10 to drive along the set route including the set turning circle.

The driving controller 74 stores information about the set route as a part of driving data 88 in the storage unit 72. The information about the set route includes the coordinates of a steering start point, the coordinates of a steering end point, the coordinates of a turnback point, the target steering angle, the instruction steering angle, the set turning radius, the coordinates of a set turning center, and the like. In addition, the driving controller 74 acquires rotational information LRR and RRR from the wheel speed sensors 18RL and 18RR during automatic driving, and stores the rotational information LRR and RRR, which is associated with an acquired time, as a part of the driving data 88 in the storage unit 72.

The estimation unit 76 estimates a turning radius (hereinafter referred to as "running turning radius) of a turning circle (hereinafter referred to as "running turning circle") on the running route RR, along which the vehicle 10 actually drives, based on left rear rotational information LRR of the left rear wheel 13RL detected by the wheel speed sensor 18RL and right rear rotational information RRR of the right rear wheel 13RR detected by the wheel speed sensor 18RR.

For example, the estimation unit 76 sets a plurality of positions (e.g., "start point", "midpoint", and "end point" to be described below) on the running route RR based on the number of left rear wheel speed pulses (hereinafter referred to as the number of left rear pulses) depending on the revolutions per minute of the left rear wheel 13RL indicated by the left rear rotational information LRR and the number of right rear wheel speed pulses (hereinafter referred to as the number of right rear pulses) depending on the number of revolutions per minute of the right rear wheel 13RR indicated by the right rear rotational information RRR. The estimation unit 76 calculates and estimates the running turning radius from the coordinates of the plurality of set positions. The estimation unit 76 outputs the estimated running turning radius to the correction unit 78.

The correction unit 78 calculates a correction value for correcting the steering angle of the steering unit 12 from the running turning radius acquired from the estimation unit 76. For example, the correction value is a value that corrects the target steering angle or the instruction steering angle, which is extracted in order to control the steering angle of the steering unit 12. The correction unit 78 may calculate the correction value based on the running turning radius and the set turning radius, which are indicated by the set path generated by the driving controller 74. Specifically, the correction unit 78 calculates a steering angle increase/decrease rate that is a ratio of the set turning radius to the running turning radius. The correction unit 78 calculates a plurality of steering angle increase/decrease rates, and calculates a correction value based on an average steering angle increase/decrease rate value that is an average value of the plurality of steering angle increase/decrease rates. The correction unit 78 stores correction data 90 including the calculated correction value in the storage unit 72.

When the correction data 90 including the correction value is stored in the storage unit 72, the driving controller 74 sets the set route based on the route data 82, and corrects the target steering angle or the instruction steering angle, which corresponds to the set turning radius of the set turning circle included in the set route, using the correction value to execute driving assist.

The storage unit 72 is realized as a function of at least one of the ROM 34b, the RAM 34c, and the SSD 34f. The storage unit 72 may be provided in an external network, for example. The storage unit 72 stores a program executed by the processing unit 70, data required for executing the program, and data produced by the execution of the program, for example. The storage unit 72 stores, for example, the driving assist program 80 executed by the processing unit 70. The storage unit 72 stores the route data 82 including route patterns, the steering table 84, and numerical value data 86 including threshold values, equations, and the like, which are required for executing the driving assist program 80. The storage unit 72 stores the driving data 88 and the correction data 90, which are produced by the execution of the driving assist program 80. The driving data 88 includes information about the set path, the target steering angle, the instruction steering angle output to the steering unit 12 at each time, a detected steering angle at each time, the rotational information LRR and RRR including the wheel speed pulses acquired from the wheel speed sensors 18RL and 18RR at each time, and the like. The correction data 90 includes the correction value and a value calculated in a process of calculating the correction value.

FIG. 4 is a view illustrating an example of the steering table 84. As illustrated in FIG. 4, the steering table 84 associates a target steering angle $\theta_{on}$ with a set turning radius $STR_n$ (where, n=1, 2, ...). The driving controller 74 extracts the target steering angle $\theta_{on}$ that corresponds to the set turning radius $STR_n$ of a set turning circle contained in a set route from the steering table 84. The driving controller 74 outputs an instruction steering angle, which is the extracted target steering angle $\theta_{on}$, to the steering system 26 to allow the vehicle 10 to drive along the set turning circle.

Figure 5:
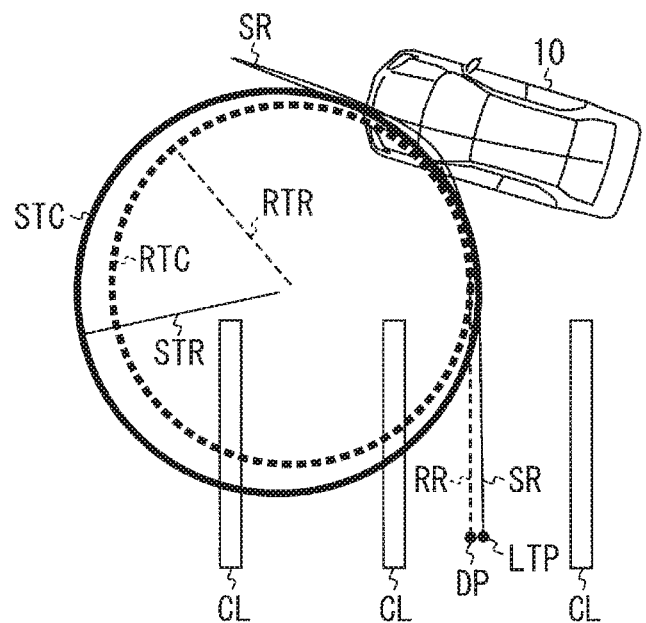
FIG. 5 is a view illustrating a set route and a running route before correction.
Figure 6:
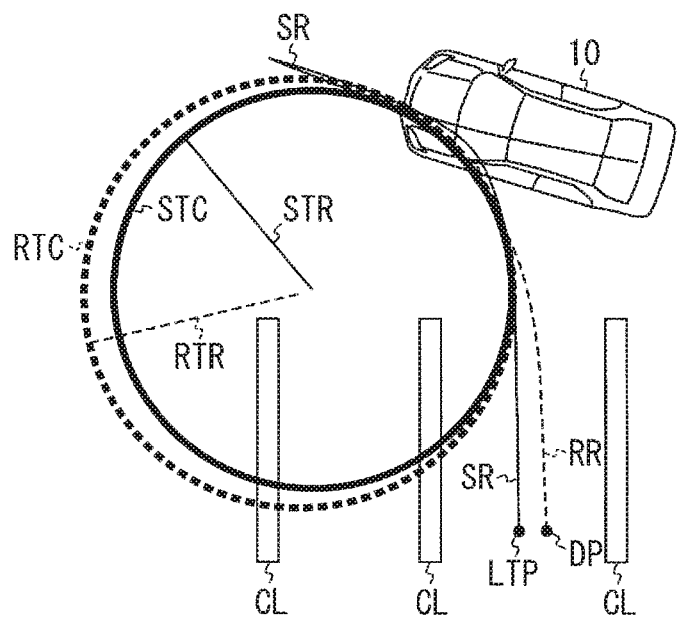
FIG. 6 is a view illustrating a set route and a running route before correction.
Figure 7:
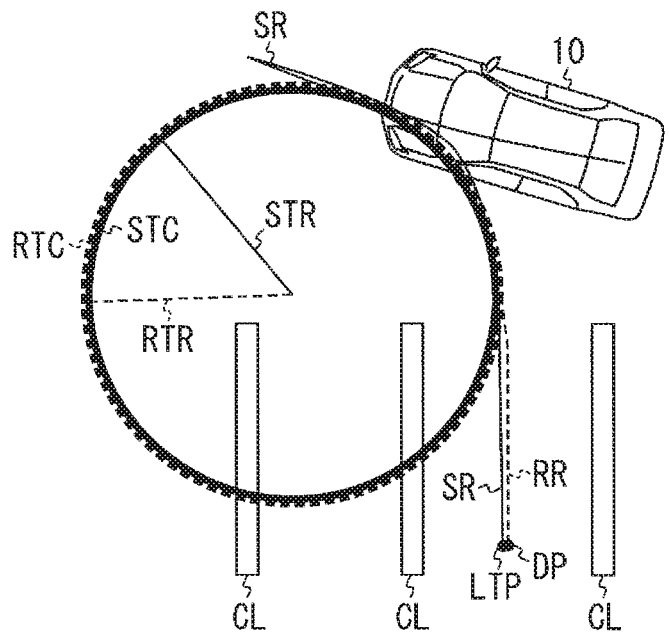
FIG. 7 is a view illustrating a set route and a running route after correction.

Next, the outline of correction of a set route SR, an actual running route RR of the vehicle 10, and a set turning radius STR will be described. FIGS. 5 and 6 are views illustrating a set route SR and a running route RR before correction. FIG. 7 illustrates a set route SR and a running route RR after correction.

In FIGS. 5 to 7, the thin solid line designates a set route SR, and the thin dotted line designates an actual running route RR. The thick solid line designates a set turning circle STC having a set turning radius STR, which forms a part of the set route SR, and the thick dotted line designates a running turning circle RTC having a running turning radius RTR, which forms a part of the actual running route RR. Here, the set route SR is a route to a parking area within a division line CL provided in a parking lot.

When a relationship between a target steering angle $\theta_c$ of the steering unit 12 and the set turning radius STR, represented in the steering table 84, is correct, the vehicle 10 drives along the set route SR including a part of the set turning circle STC when it is automatically driven. However, since an actual relationship between the target steering angle $\theta_c$ and the set turning radius STR may differ from the relationship in the steering table 84 depending on respective characteristics of the vehicles 10, the environment around the vehicle 10, or the like, the vehicle 10 may drive along the running route RR, which differs from the set route SR.

For example, as illustrated in FIG. 5, the vehicle 10 drives along the running turning circle RTC having the running turning radius RTR, which is smaller than the set turning radius STR of the set turning circle STC, depending on the characteristics thereof. As illustrated in FIG. 6, the vehicle 10 drives along the running turning circle RTC having the running turning radius RTR, which is larger than the set turning radius STR of the set turning circle STC, depending on the characteristics thereof. Thereby, the driving controller 74 guides the vehicle 10 to a position DP, which differs from the target point LTP on the set route SR, by automatic driving.

Thus, the estimation unit 76 estimates the running turning radius RTR of the running turning circle RTC based on an own vehicle position on the running route RR, which is estimated from the left rear rotational information LRR and the right rear rotational information RRR of the vehicle 10, which is driving on the running turning circle RTC. The correction unit 78 calculates a correction value for correcting the steering angle of the steering unit 12 based on the running turning radius RTR estimated by the estimation unit 76 and the set turning radius STR.

Thereby, as illustrated in FIG. 7, the estimation unit 76 and the correction unit 78 reduce a deviation between the set turning circle STC and the running turning circle RTC, so that the actual running route RR of the vehicle 10 in automatic driving approaches the set route SR.

Figure 8:
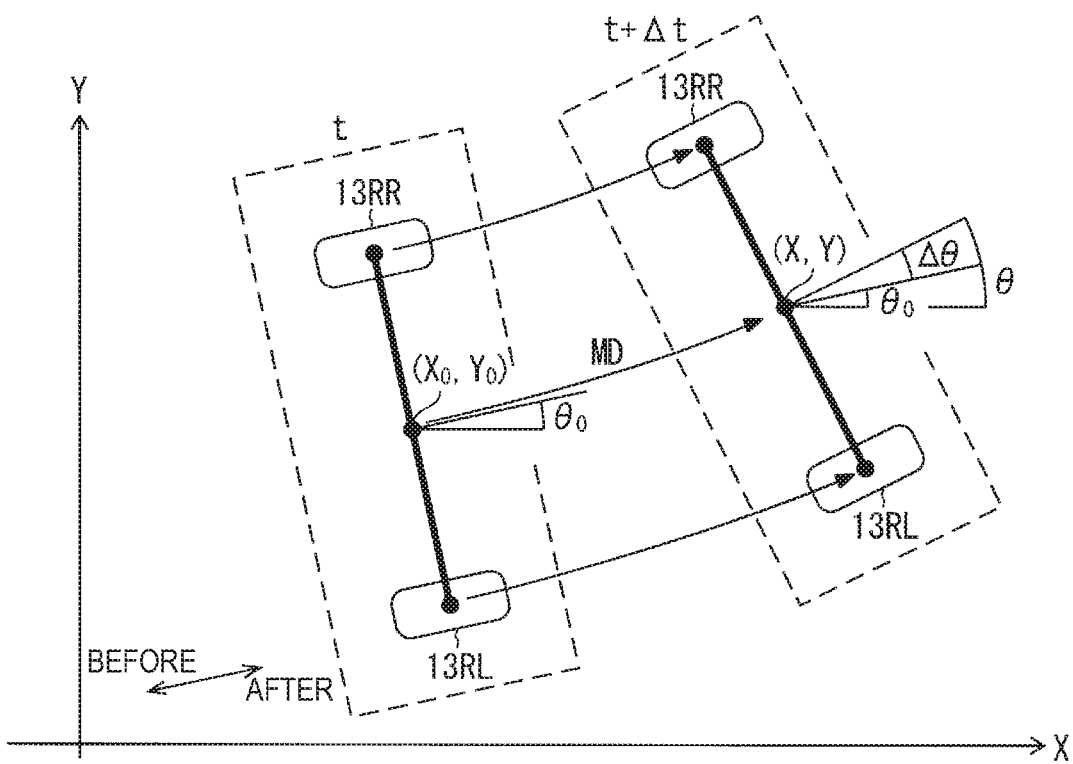
FIG. 8 is a view for explaining an example of a method of estimating an own vehicle position by an estimation unit.

FIG. 8 is a view for explaining an example of a method of estimating an own vehicle position by the estimation unit 76. The estimation unit 76 may estimate an own vehicle position on the running route RR using the rotational information LRR and RRR by a known method illustrated in FIG. 8 (e.g., Japanese Patent Laid-Open Publication No. 2015-075337). FIG. 8 illustrates a case where the vehicle 10, which is oriented towards a direction $\theta_0$ at a position of the coordinates $(X_0, Y_0)$ at a point in time t, moves to the coordinates $(X, Y)$ and is oriented towards a direction $\theta$ at a point in time t+$\Delta$t. Assuming that the turning center and turning radius of the vehicle 10 do not vary during a time $\Delta$t and that the vehicle 10 moves linearly, a movement distance MD of the vehicle 10 may be represented by the following Equation.

$$MD = k(N_L + N_R)/2$$

where, k: coefficient for converting the number of pulses to the movement distance,
NL: the number of left rear pulses during $\Delta$t,
NR: the number of right rear pulses during $\Delta$t.

Here, assuming that $X = X_0 + \Delta X$ and $Y = Y_0 + \Delta Y$, $\Delta X$ and $\Delta Y$ may be represented by the following Equations.

$$\Delta X = MD \cos \theta_0 = (k(N_L + N_R)/2) \cos \theta_0 \quad (1)$$

$$\Delta Y = MD \sin \theta_0 = (k(N_L + N_R)/2) \sin \theta_0 \quad (2)$$

In addition, the direction $\theta$ of the vehicle 10 at the point in time t+$\Delta$t may be represented by the following Equation.

$$\theta = \theta_0 + \Delta\theta = \theta_0 + k \cdot \Delta t (N_L - N_R)/TW \quad (3)$$

where, TW: tread width.

The estimation unit 76 detects the actual running route RR of the vehicle 10 by calculating the own vehicle position for each time $\Delta$t using Equations (1), (2) and (3).

Figure 9:
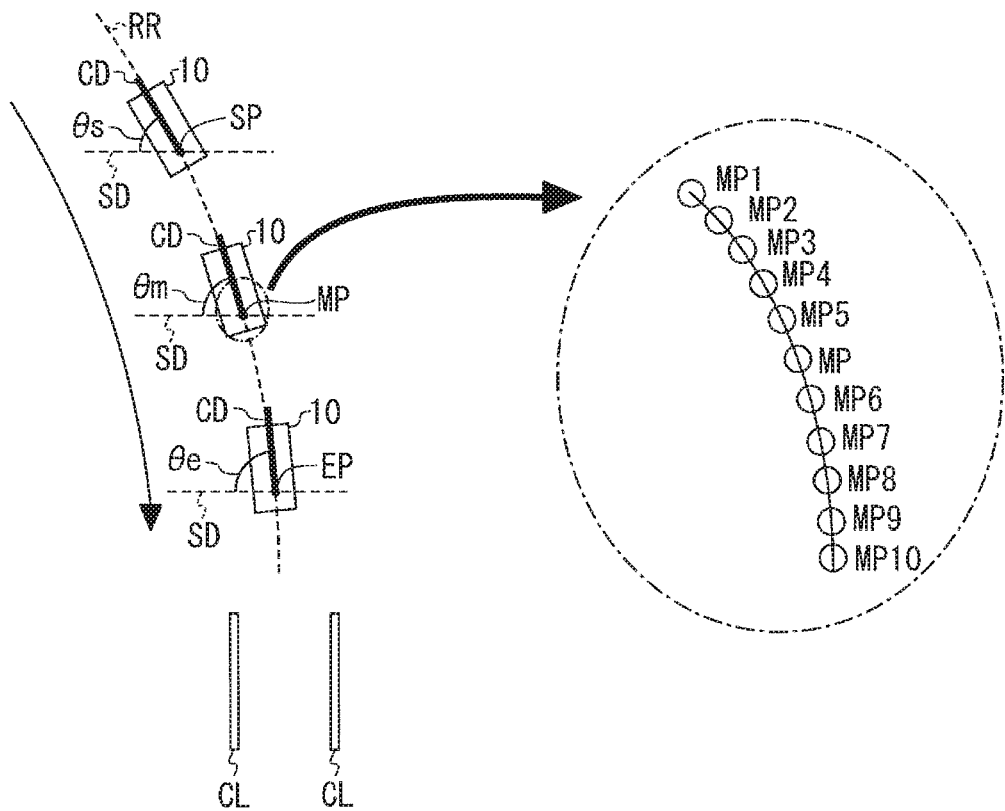
FIG. 9 is a view for explaining an example of the own vehicle position estimated by the estimation unit.

FIG. 9 is a view for explaining an example of an own vehicle position estimated by the estimation unit 76. As illustrated in FIG. 9, the estimation unit 76 sets a start point SP, a midpoint MP, a plurality of sub-midpoints MPm (m=1, 2 . . . ), and an end point EP on the running route RR based on the instruction steering angle, the detected steering angle, the target steering angle $\theta_c$, and the number of pulses indicated by the rotational information LRR and RRR. The estimation unit 76 estimates a running turning radius RTR from the coordinates of the start point SP, the midpoint MP, the sub-midpoints MPm, and the end point EP. The coordinates of the vehicle 10 are, for example, the coordinates of the center of a rear axle of the vehicle 10.

The estimation unit 76 sets the start point SP on the running route RR based on the driving data 88, which is stored in the storage unit 72 by the driving controller 74 during automatic driving. The estimation unit 76 may set the start point SP on the running route RR based on the instruction steering angle indicated by the driving data 88, the detected steering angle of the steering unit 12, and the target steering angle $\theta_c$ associated with the set turning radius STR of the set turning circle STC on the set route SR. For example, the estimation unit 76 may set a point on the running route RR that satisfies a predetermined start point condition as the start point SP. An example of the start point condition is as follows.

(First start point condition) The instruction steering angle is fixed.

(Second start point condition) A difference obtained by subtracting the instruction steering angle from the target steering angle is equal to or less than a first threshold value residual.

(Third start point condition) A difference obtained by subtracting the detected steering angle from the instruction steering angle is equal to or less than a second threshold value residual.

The first threshold value residual and the second threshold value residual are predetermined and stored as the numerical value data 86 in the storage unit 72. The first threshold value residual is a value for determining that the instruction steering angle substantially coincides with the target steering angle $\theta_c$, and, for example, is several degrees. The second threshold value residual is a value for determining that the detected steering angle substantially coincides with the instruction steering angle, and is set by the resolving power of the steering unit sensor 16, the value of overshoot of the steering unit sensor 16, or the like. In addition, the estimation unit 76 may set a point that satisfies any one condition (e.g., the second and the third start point conditions), among the above-described start point conditions, to the start point SP.

The estimation unit 76 may set a point on the running route RR, at which the set turning circle STC ends, to the end point EP. For example, the estimation unit 76 may set the end point EP on the running route RR based on the instruction steering angle output from the driving controller 74. Specifically, the estimation unit 76 may set a point after the start point SP, at which the fixed instruction steering angle is changed, to the end point EP.

The estimation unit 76 may set the midpoint MP on the running route RR based on the angle between a reference direction SD and the direction of the vehicle 10 (hereinafter referred to as an "own vehicle direction CD"). An example of the reference direction SD is a direction orthogonal to the division line CL. For example, the estimation unit 76 may set a point, which corresponds to an average angle $\theta$m of a start point angle $\theta$s, which is the angle between the own vehicle direction CD and the reference direction SD at the start point SP, and an end point angle $\theta$e, which is the angle between the own vehicle direction CD and the reference direction SD at the end point EP, to the midpoint MP based on the rotational information LRR and RRR.

More specifically, the estimation unit 76 calculates the start point angle θs and the end point angle θe from the rotational information LRR and RRR by the method illustrated in FIG. 8. The estimation unit 76 calculates an average angle of the start point angle θs and the end point angle θe ((θs+θe)/2). The estimation unit 76 calculates the angle between the reference direction SD and the own vehicle direction CD at each point on the running route RR, and sets a point, at which the calculated angle is the average angle, to the midpoint MP.

In addition, the estimation unit 76 may set the sub-midpoints MPm at positions before and after the midpoint MP on the running route RR. Here, m=1, 2, . . . . The estimation unit 76 sets positions of the sub-midpoints MPm at a distance equal to or greater than one wheel speed pulse. The estimation unit 76 may set the positions of the sub-midpoints MPm between a middle position between the start point SP and the midpoint MP and a middle position between the midpoint MP and the end point EP.

Figure 10:
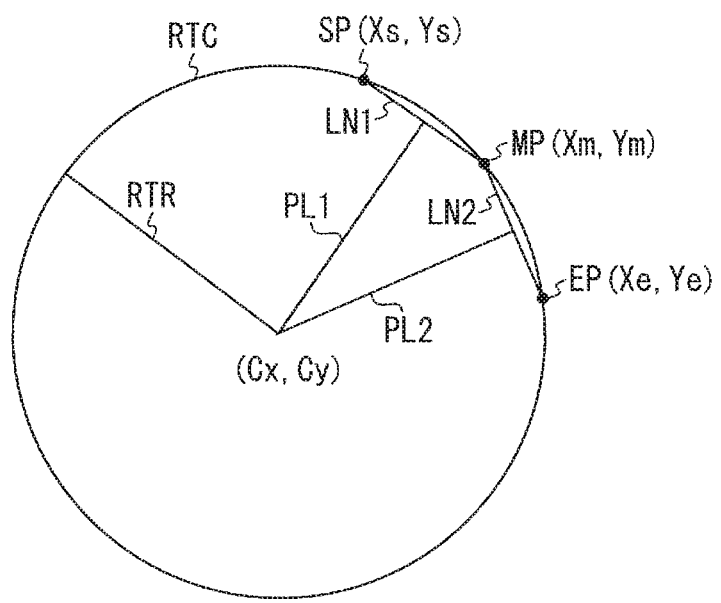
FIG. 10 is a view for explaining a method of estimating a running turning radius.

Next, a method of estimating the running turning radius RTR by the estimation unit 76 will be described. FIG. 10 is a view for explaining a method of estimating the running turning radius RTR.

As illustrated in FIG. 10, the estimation unit 76 calculates the coordinates of the start point SP, the midpoint MP, the sub-midpoints MPm, and the end point EP from the rotational information LRR and RRR by the method illustrated in FIG. 8. The coordinates of the start point SP are (Xs, Ys). The coordinates of the midpoint MP are (Xm, Ym). The coordinates of the end point EP are (Xe, Ye).

A position, at which a first perpendicular line PL1 of a first straight line LN1, which interconnects the start point SP and the midpoint MP, intersects with a second perpendicular line PL2 of a second straight line LN2, which interconnects the midpoint MP and the end point EP, is the center of the running turning circle RTC. Here, a first gradient GR1 and a first segment IN1 of the first perpendicular line PL1 and a second gradient GR2 and a second segment IN2 of the second perpendicular line PL2 may be represented by the following Equations.

$$GR1 = -1/((Ys-Ym)/(Xs-Xm)) \quad (4)$$

$$IN1 = (Ys+Ym)/2 - GR1 \times ((Xs+Xm)/2) \quad (5)$$

$$GR2 = -1/((Ym-Ye)/(Xm-Xe)) \quad (6)$$

$$IN2 = (Ym+Ye)/2 - GR2 \times ((Xm+Xe)/2) \quad (7)$$

Next, the coordinates (Cx, Cy) of the center of the running turning circle RTC may be represented by the following Equations.

$$Cx = (IN2-IN1)/(GR1-GR2) \quad (8)$$

$$Cy = GR1 \times Cx + IN1 \quad (9)$$

Accordingly, assuming that a virtual running turning radius is VRTR, the virtual running turning radius may be represented by the following Equation.

$$VRTR = ((Cx-Xs)2 + (Cy-Ys)2)^{1/2} \quad (10)$$

The estimation unit 76 may calculate the virtual running turning radius based on the coordinates of the start point SP, the midpoint MP, and the end point EP and Equations (4) to (10). The respective Equations may be included in the numerical value data 86 and stored in the storage unit 72.

Similarly, when the estimation unit 76 sets the plurality of sub-midpoints MPm, the estimation unit 76 may calculate a plurality of virtual running turning radii based on the coordinates of the plurality of sub-midpoints MPm, the start point SP and the end point EP by the same method as the above-described method of calculating the virtual running turning radius described above. In this case, the estimation unit 76 calculates the plurality of virtual running turning radii equal in number to the number of the midpoint MP and the sub-midpoints MPm. The estimation unit 76 may calculate the running turning radius RTR based on the plurality of virtual running turning radii. For example, the estimation unit 76 may calculate a median of the plurality of virtual running turning radii as the running turning radius RTR.

Here, the correction unit 78 may not adopt all of the calculated running turning radii RTR for calculating a correction value, and may determine whether or not to adopt a corresponding running turning radius RTR based on a predetermined condition. An example of the adoption condition is as follows.

(First adoption condition) The vehicle speed is less than a vehicle speed threshold.

(Second adoption condition) The ratio of an arc, along which the vehicle drives, to the entire circle is equal to or greater than an arc threshold value.

(Third adoption condition) A difference (or ratio) between the set turning radius and the driving turning radius is less than a radius threshold value.

The correction unit 78 may adopt the calculated running turning radius RTR when one or a plurality of above-described three adoption conditions is satisfied. Thereby, the correction unit 78 reduces the influence of the running turning radius RTR with a high probability of becoming an inappropriate value. The arc threshold value and the radius threshold value may be appropriately set based on the estimation accuracy, and may be stored as a part of the numerical value data 86.

Next, a processing of calculating a correction value from the running turning radius RTR by the correction unit 78 will be described.

Figure 11:
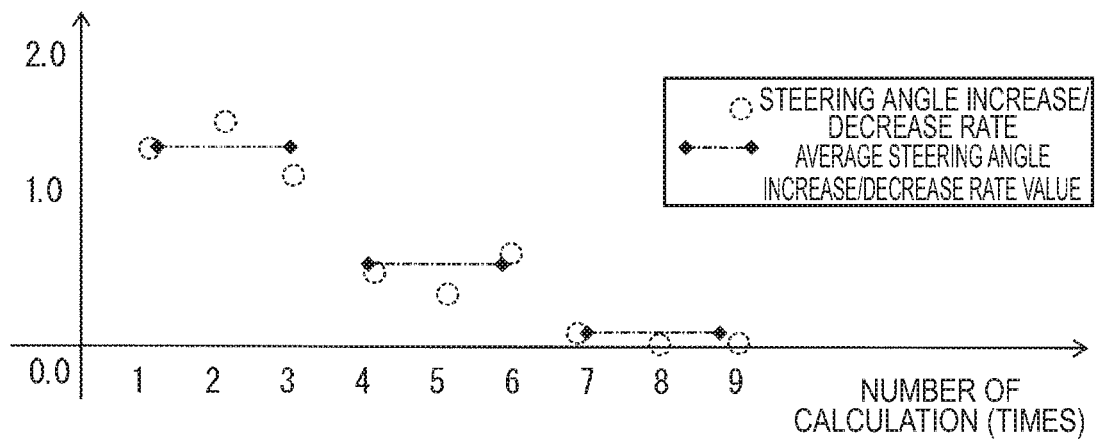
FIG. 11 is a graph illustrating a relationship between a steering angle increase/decrease rate and the number of calculations.
Figure 12:
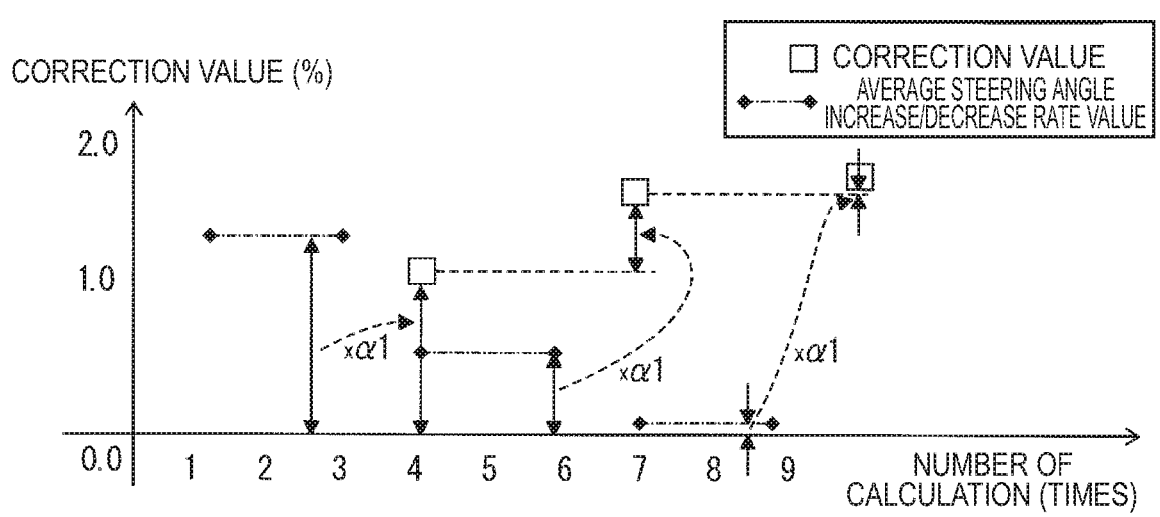
FIG. 12 is a graph illustrating a relationship between a correction value and the number of calculations.

FIG. 11 is a graph illustrating a relationship between a steering angle increase/decrease rate and the number of calculations. FIG. 12 is a graph illustrating a relationship between a correction value and the number of calculations. In addition, the number of calculations is the number of times of calculating a correction value using the running turning radius RTR that satisfies the adoption condition, among the number of times of automatic driving.

As illustrated in FIG. 11, the correction unit 78 calculates a steering angle increase/decrease rate, which is a ratio of the running turning radius RTR estimated by the estimation unit 76 to the set turning radius STR acquired from the driving controller 74, for each parking.

The correction unit 78 calculates an average steering angle increase/decrease rate value that is an average value of steering angle increase/decrease rates whenever the number of times of calculating the steering angle increase/decrease rate reaches a predetermined set average number of times. An example of the set average number of times is 3 times.

Here, the correction unit 78 may store a provisional average value, which is calculated by averaging out past steering angle increase/decrease rates whenever acquiring the running turning radius RTR from the estimation unit 76, and the number of calculations in the storage unit 72 until the number of calculations reaches the set average number of times to calculate the average steering angle increase/decrease rate value. Specifically, when acquiring the running turning radius RTR at a first parking time from the estimation unit 76, the correction unit 78 stores "1" as the number of calculations and a provisional average value (here, a first steering angle increase/decrease rate) as a part of the correction data 90 in the storage unit 72. Subsequently, when acquiring the running turning radius RTR at a second parking time from the estimation unit 76, the correction unit 78 stores "2" as the number of calculations and a provisional average value, which is an average value of the first and second steering angle increase/decrease rates in the storage unit 72, and deletes "1" as the previously stored number of calculations and the previous provisional average value (here, the first steering angle increase/decrease rate) from the storage unit 72. Thereafter, when acquiring the running turning radius RTR at an M-th parking time from the estimation unit 76 by repeating the same processing, the correction unit 78 calculates a new provisional average value by dividing the sum of a current steering angle increase/decrease rate and the product of "M−1", which is the number of calculations stored in advance in the storage unit 72, and a provisional average value (an average value of steering angle increase/decrease rates up to (M−1)th times) by "M", which is a current number of calculations. The correction unit 78 stores "M" as the number of calculations and a provisional average value of the first to M-th steering angle increase/decrease rates as the correction data 90 in the storage unit 72, and deletes "M−1" as the previous stored number of calculations and a previous provisional average value (here, an average value of M−1 steering angle increase/decrease rates) from the storage unit 72. Thereby, the correction unit 78 may reduce the capacity of the storage unit 72 required for correction.

When the number of calculations reaches the set average number of times, the correction unit 78 calculates an average steering angle increase/decrease rate value by dividing the sum of a current running turning radius RTR and the product of the number of calculations (here, the set average number of times−1) and the provisional average value stored in the storage unit 72 by the set average number of times. In addition, the correction unit 78 resets the number of calculations to "0". The correction unit 78 stores the average steering angle increase/decrease rate value as a part of the correction data 90 in the storage unit 72.

As illustrated in FIG. 12, the correction unit 78 calculates a provisional correction value by multiplying the average steering angle increase/decrease rate value by a first correction coefficient $\alpha 1$. The correction unit 78 calculates a correction value based on the corresponding provisional correction value. The first correction coefficient $\alpha 1$ is a positive value less than 1, for example, "0.8".

Here, when variation in the average steering angle increase/decrease rate value is equal to or greater than a preset variation threshold value, the correction unit 78 may calculate the correction value based on a provisional correction value obtained by multiplying the average steering angle increase/decrease rate value by a second correction coefficient $\alpha 2$, which is smaller than the first correction coefficient $\alpha 1$. The second correction coefficient $\alpha 2$ is, for example, "0.2". Thereby, the correction unit 78 reduces the influence of the steering angle increase/decrease rate and the average steering angle increase/decrease rate value, which become abnormal values when the circumstances around the vehicle 10 are unusual (e.g., in the case of a slope), on the correction value.

When calculating the provisional correction value by multiplying the average steering angle increase/decrease rate value by any one of the correction coefficients $\alpha 1$ and $\alpha 2$, the correction unit 78 calculates a new correction value by adding the calculated provisional correction value to a correction value, which is the sum of all of completely calculated provisional correction values. In addition, the provisional correction value is the correction value at a first set average number of times. The correction unit 78 stores the calculated correction value as a part of the correction data 90 in the storage unit 72.

The driving controller 74 corrects automatic driving based on the correction value calculated by the correction unit 78. For example, the driving controller 74 corrects the target steering angle or the instruction steering angle for controlling the steering angle of the steering system 26 based on the correction value. Specifically, the driving controller 74 controls the steering unit 12 based on a new target steering angle or instruction steering angle that is obtained by dividing the target steering angle or the instruction steering angle by the correction value. Thereby, after setting the correction value (in an example illustrated in FIG. 11, the number of calculations is more than four), the steering angle increase/decrease rate is reduced and approaches "0".

Thereafter, similarly to a processing up to the above-described set average number of times (a third time illustrated in FIG. 11), the correction unit 78 calculates a new average steering angle increase/decrease rate value by repeatedly calculating a provisional average value until the number of calculations reaches a next set average number of times (a sixth time illustrated in FIG. 11) based on the running turning radius RTR acquired from the estimation unit 76. Here, the average steering angle increase/decrease rate value, calculated at the second set average number of times, becomes smaller than the average steering angle increase/decrease rate value calculated at the first set average number of times and approaches "0". However, since the vehicle 10 is automatically driven based on the correction value obtained by multiplying the average steering angle increase/decrease rate value by the first correction coefficient $\alpha 1$, which is less than 1, the average steering angle increase/decrease rate value calculated at the second set average number of times is not normally "0". Thereafter, as illustrated in FIG. 12, the correction unit 78 calculates a provisional correction value, which is the product of the average steering angle increase/decrease rate value, calculated at the second set average number of times, and the first correction coefficient $\alpha 1$ (or the second correction coefficient $\alpha 2$). The correction unit 78 calculates the sum of the corresponding provisional correction value and the correction value calculated at the first set average number of times as a new correction value.

By repeating the same processing, the correction unit 78 calculates a new average steering angle increase/decrease rate value and a new provisional correction value for each set average number of times of parking, and calculates the sum of the corresponding provisional correction value and the previous correction value as a new correction value. In other words, the correction unit 78 calculates the correction value by accumulating provisional correction values calculated for each set average number of times. Thereby, the average steering angle increase/decrease rate value is gradually reduced and approaches "0". The correction unit 78 stores the calculated correction value as a part of the correction data 90 in the storage unit 72.

Figure 13:
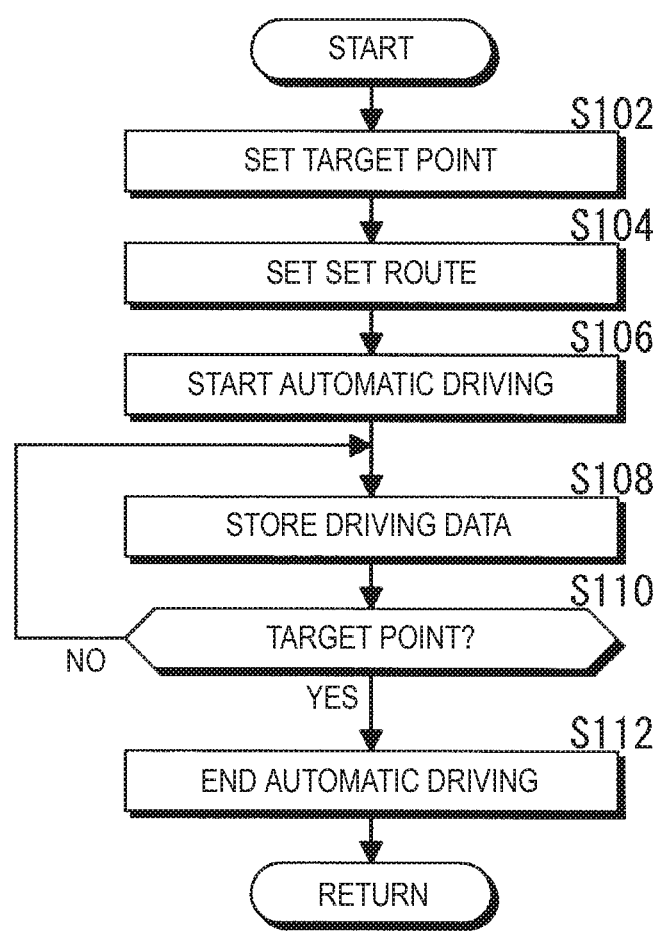
FIG. 13 is a flowchart of a driving control processing in a driving assist processing executed by a driving controller of a processing unit.

FIG. 13 is a flowchart of a driving control processing in a driving assist processing executed by the driving controller 74 of the processing unit 70. For example, when receiving an instruction of automatic driving from the driver via the operation input unit 68 in a state where an image such as a parking frame, which receives the instruction of automatic driving, is displayed on the display unit 64, the driving controller 74 starts a driving control processing.

As illustrated in FIG. 13, in the driving control processing of the driving assist processing, the driving controller 74 sets a target point LTP (S102). An example of the target point LTP is a parking position at which the vehicle 10 is parked. For example, the driving controller 74 sets the target point LTP on the basis of the current position of the vehicle 10 based on captured images acquired from the imaging units 14.

The driving controller 74 sets a set route SR from the current position of the vehicle 10 to the target point LTP based on the route data 82 (S104). The driving controller 74 controls the systems 22, 24, 26, and 28 to start automatic driving to the target point LTP (S106). Here, when a correction value has already been stored in the storage unit 72, the driving controller 74 corrects and controls the steering angle of the steering unit 12 of the steering system 26 based on an instruction steering angle corrected by the corresponding correction value.

The driving controller 74 stores the driving data 88 in the storage unit 72 during automatic driving (S108). For example, the driving controller 74 sequentially stores the driving data 88 including information about the set route SR, the target steering angle $\theta_c$, the instruction steering angle output to the steering unit 12 at each point in time, the detected steering angle at each point in time, the rotational information LRR and RRR including the wheel speed pulses acquired from the wheel speed sensors 18RL and 18RR at each point in time, and the like. The driving controller 74 sequentially stores the driving data 88 in the storage unit 72 while continuing automatic driving until the vehicle reaches the target point LTP (S110: No).

When reaching the target point LTP (S110: Yes), the driving controller 74 terminates the automatic driving (S112), and enters a standby state until a next driving control processing is executed.

Figure 14:
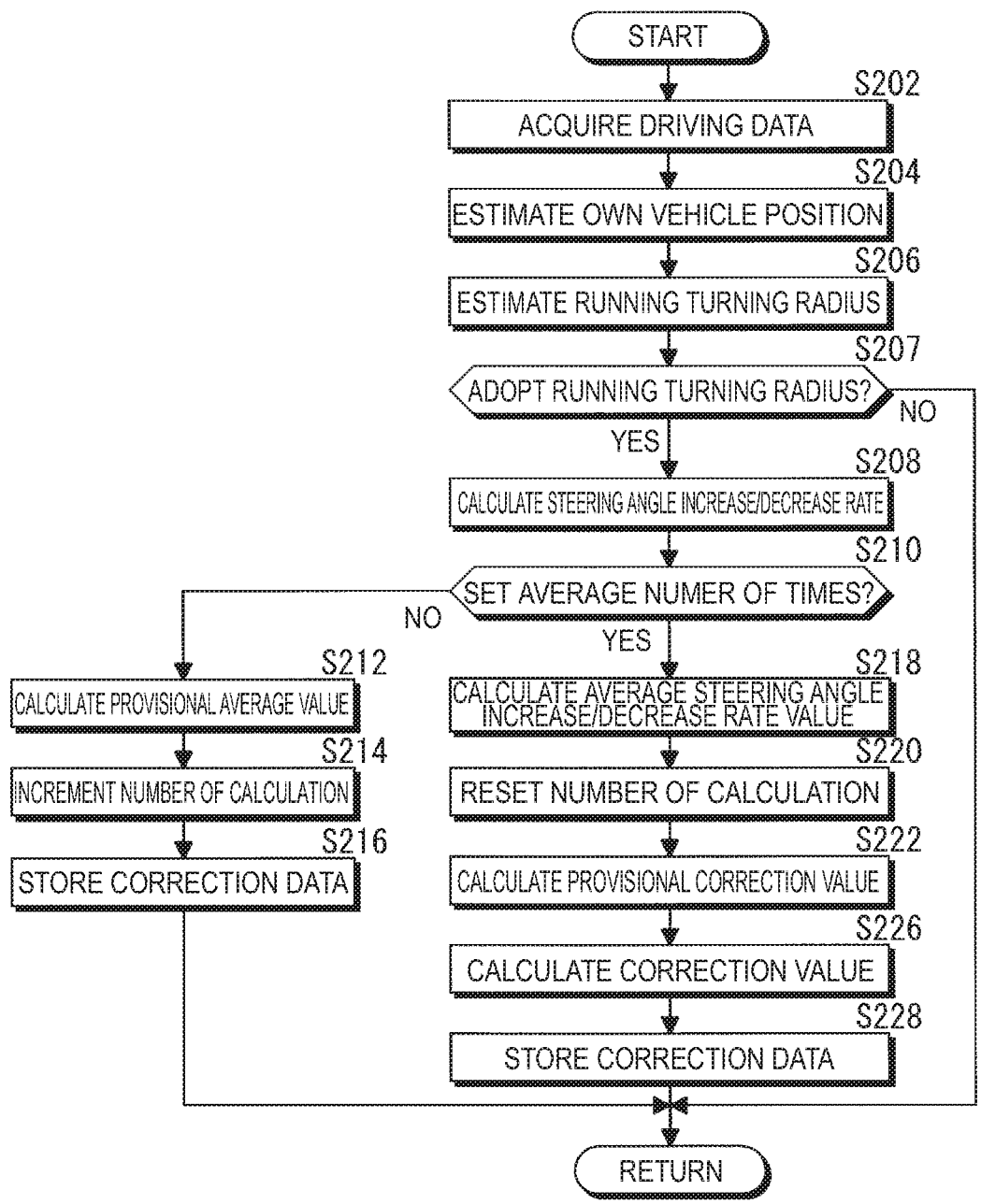
FIG. 14 is a flowchart of a correction processing in the driving assist processing executed by the estimation unit and a correction unit of the processing unit.

FIG. 14 is a flowchart of a correction processing in the driving assist processing executed by the estimation unit 76 and the correction unit 78 of the processing unit 70. The estimation unit 76 and the correction unit 78 may execute the correction processing concurrently with the driving control processing described above.

As illustrated in FIG. 14, in the correction processing of the driving assist processing, the estimation unit 76 acquires the driving data 88 stored in the storage unit 72 (S202).

The estimation unit 76 estimates an own vehicle position on the running route RR, along which the vehicle 10 has actually traveled via automatic driving based on the set route SR, from the method illustrated in FIG. 8 and the driving data 88 (S204). Here, the estimation unit 76 estimates an own vehicle position on the running route RR within the range in which the steering unit 12 is turning in a fixed state, that is, on the running turning circle RTC. That is, as illustrated in FIG. 9, the estimation unit 76 sets the start point SP, the midpoint MP, the plurality of sub-midpoints MPm, and the end point EP on the running route RR, and estimates the own vehicle position so as to calculate the coordinates and direction of each point.

The estimation unit 76 estimates the running turning radius RTR on the actual running route RR from the coordinates of the start point SP, the midpoint MP, the plurality of sub-midpoints MPm, and the end point EP based on the method illustrated in FIG. 10 (S206). Specifically, the estimation unit 76 calculates a plurality of virtual running turning radii based on the start point SP, the midpoint MP, the plurality of sub-midpoints MPm, and the end point EP, and adopts a median of the plurality of running turning radii RTR as the running turning radius RTR.

The correction unit 78 determines whether or not to adopt the running turning radius RTR acquired from the estimation unit 76 for calculating a correction value (S207). Specifically, the correction unit 78 may determine whether or not to adopt the running turning radius RTR based on the first adoption condition to the third adoption condition described above.

When determining that the running turning radius RTR is not adopted (S207: No), the correction unit 78 terminates the correction processing without calculating a new correction value, and enters a standby state until a next driving control processing is executed.

On the other hand, when determining that the running turning radius RTR is adopted (S207: Yes), the correction unit 78 calculates a steering angle increase/decrease rate based on the corresponding running turning radius RTR (S208). Specifically, the ratio of the running turning radius RTR to the set turning radius STR included in the driving data 88 is calculated as the steering angle increase/decrease rate.

The correction unit 78 determines whether or not the number of times of calculating the steering angle increase/decrease rate is the set average number of times (S210).

When determining that the number of times of calculating the steering angle increase/decrease rate is not the set average number of times (S210: No), the correction unit 78 calculates a provisional average value of the steering angle increase/decrease rate (S212). The correction unit 78 increments the number of calculations by +1 (S214). The correction unit 78 stores the number of calculations and the provisional average value as the correction data 90 in the storage unit 72 (S216). Thereby, the estimation unit 76 and the correction unit 78 terminate the correction processing, and enters a standby state until a next driving control processing is executed.

On the other hand, when determining that the number of times of calculating the steering angle increase/decrease rate is the set average number of times (S210: Yes), the correction unit 78 calculates an average steering angle increase/decrease rate value (S218). Specifically, the correction unit 78 calculates the sum of the product of the number of calculations (in this example, the set average number of times−1) and a provisional average value stored in the storage unit 72 and a current steering angle increase/decrease rate. The correction unit 78 calculates the average steering angle increase/decrease rate value by dividing the calculated sum by the set average number of times. The correction unit 78 resets the number of calculations (S220).

The correction unit 78 calculates a provisional correction value based on the average steering angle increase/decrease rate value (S222). Specifically, the correction unit 78 calculates the provisional correction value by multiplying the average steering angle increase/decrease rate value and one of the correction coefficients α1 and α2. In addition, the correction unit 78 may select one of the correction coefficients α1 and α2 depending on whether or not the steering angle increase/decrease rate and the average steering angle increase/decrease rate value are abnormal values. For example, the correction unit 78 may determine whether or not the steering angle increase/decrease rate and the average steering angle increase/decrease rate value are abnormal values based on, for example, comparison between the steering angle increase/decrease rates and comparison between a past average steering angle increase/decrease rate value and a current average steering angle increase/decrease rate value.

The correction unit 78 calculates a correction value based on the calculated provisional correction value (S226). Specifically, the correction unit 78 calculates the sum of a current provisional correction value and a correction value already stored in the storage unit 72 as a new correction value. The correction unit 78 stores the calculated new correction value and the reset number of calculations as the correction data 90 in the storage unit 72 (S228). Thereby, the estimation unit 76 and the correction unit 78 terminate the correction processing, and enters a standby state until a next driving control processing is executed.

As described above, in the driving assist system 20, the wheel speed sensors 18RL and 18RR detect the rotational information LRR and RRR about the actual rotation of the right and left wheels 13RL and 13RR, and the processing unit 70 estimates the running turning radius RTR from the corresponding rotational information LRR and RRR. Thereby, compared to a case of estimating the running turning radius RTR based on, for example, the instruction steering angle or the detected steering angle depending on the characteristics of the vehicle 10, the driving assist system 20 may estimate the actual running turning radius RTR of the vehicle 10 with higher accuracy.

Since the driving assist system 20 calculates a correction value for correcting the steering angle based on the running turning radius RTR estimated with higher accuracy, the accuracy of the correction value may be improved. Thereby, the driving assist system 20 may drive the vehicle 10 along the set route SR with high accuracy.

In the driving assist system 20, the processing unit 70 calculates the correction value by multiplying an average steering angle increase/decrease rate value by the first correction coefficient α1, which is less than 1. Thereby, the driving assist system 20 may reduce the influence of an abnormal value on the correction value even when the average steering angle increase/decrease rate value becomes the abnormal value.

In the driving assist system 20, when variation in the steering angle increase/decrease rate and the average steering angle increase/decrease rate value is large, the processing unit 70 calculates the correction value by multiplying the average steering angle increase/decrease rate value by the second correction coefficient α2, which is smaller than the first correction coefficient α1. Thereby, the driving assist system 20 may reduce inappropriate influence on the correction value, which increases when variation in the average steering angle increase/decrease rate value is large.

In the driving assist system 20, the processing unit 70 sets the midpoint MP based on the start point angle θs of the start point SP and the end point angle θe of the end point EP calculated from the actually measured rotational information LRR and RRR. Thereby, compared to a case where the midpoint MP is set based on the coordinates, the processing unit 70 may make the distance along the running turning circle RTC of the start point SP and the midpoint MP and the distance along the running turning circle RTC of the midpoint MP and the end point EP more equal. Thereby, since the distances between the midpoint MP, the start point SP, and the end point EP may be increased, the driving assist system 20 may calculate the running turning radius RTR with higher accuracy.

In the driving assist system 20, the processing unit 70 calculates a median of a plurality of virtual running turning radii calculated based on the midpoint MP and the plurality of sub-midpoints MPm as the running turning radius RTR. Thereby, the driving assist system 20 may further improve the accuracy of calculation of the running turning radius RTR, compared to a case where the running turning radius RTR is calculated only from the midpoint MP.

The functions, connection relationships, number, arrangement, etc. of the configurations of the respective embodiments described above may be appropriately changed or deleted within the scope of the disclosure and the range equivalent to the scope of the disclosure. The respective embodiments may be appropriately combined. The order of the respective steps of each embodiment may be appropriately changed.

In the above-described embodiment, the wheel speed pulses depending on the revolutions per minute of the wheels 13 detected by the wheel speed sensors 18RL and 18RR have been described as an example of the rotational information LRR and RRR, but this disclosure is not limited thereto. The rotational information LRR and RRR may be a value related to the number of revolutions of the wheels 13, and may be, for example, the number of revolutions (or rotation angle) of a motor, an engine, or the like that rotates the wheels 13.

In the above-described embodiment, an example in which the median of the plurality of running turning radii RTR is adopted as the running turning radius RTR has been described, but the adopted running turning radius RTR is not limited thereto. For example, the average value of the plurality of running turning radii RTR may be adopted as the running turning radius RTR.

In the above-described embodiment, an example in which the correction value is a value for correcting a steering angle based on the target steering angle or the instruction steering angle has been described, but this disclosure is not limited thereto. For example, the correction value may be a value capable of correcting the steering angle, and may be a value that corrects the set turning radius STR associated with the target steering angle θ, or the target steering angle $θ_c$ of the steering table 84. In this case, the steering table 84 may be corrected.

In the above-described embodiment, an example in which the correction unit 78 calculates one correction value has been described, but this disclosure is not limited thereto. For example, the correction unit 78 may separately calculate the correction value for left turning and the correction value for right turning, and may produce the correction data 90 including the correction value associated with left turning and the correction value associated with right turning.

In the above-described embodiment, an example in which the correction unit 78 calculates the correction value based on the set turning radius STR of the set route SR during automatic driving has been described, but this disclosure is not limited thereto. For example, the correction unit 78 may calculate the correction value based on the set turning radius STR that is associated with the target steering angle θ, equal to the steering angle in a state where the driver is driving and the running turning radius RTR.

In the above-described embodiment, an example in which the correction unit 78 calculates the correction value by multiplying the average steering angle increase/decrease rate value by a correction coefficient α1 or α2 has been described, but this disclosure is not limited thereto. The correction unit 78 may calculate the correction value by multiplying the steering angle increase/decrease rate by the correction coefficient α1 or α2.

In the above-described embodiment, an example in which the estimation unit 76 calculates the running turning radius RTR based on the coordinates of the start point SP, the midpoint MP, the sub-midpoints MPm, and the end point EP calculated from the rotational information LRR and RRR has been described, the method of calculating the running turning radius RTR is not limited thereto. The estimation unit 76 may calculate the running turning radius RTR based on the coordinates of at least three points among the start point SP, the midpoint MP, the sub-midpoints MPm, and the end point EP. For example, the estimation unit 76 may calculate the running turning radius RTR based on the coordinates of the start point SP, the end point EP, and a point on the running route RR (not limited to the midpoint MP) between the start point SP and the end point EP. Even in this case, since the running turning radius RTR is calculated based on the coordinates of the start point SP and the end point EP calculated from the actually measured rotational information LRR and RRR, the driving assist system 20 may calculate the running turning radius RTR with high accuracy.

In the above-described embodiment, automatic driving in parallel parking (row parking) into a parking space has been described by way of example, but the above-described embodiments may be applied to automatic driving in in-line parking or other driving assist.

In the above-described embodiment, an example in which the estimation unit 76 estimates an own vehicle position based on the rotational information LRR and RRR of the wheel speed sensors 18RL and 18RR has been described, but the own vehicle position may be estimated based on the rotational information of the wheel speed sensors 18FL and 18FR.

A driving assist system according to an aspect of this disclosure includes a first detection unit configured to detect first rotational information that is information about rotation of a left wheel of a vehicle, a second detection unit configured to detect second rotational information that is information about rotation of a right wheel of the vehicle, and a processing unit configured to estimate a running turning radius of a running turning circle on a running route on which the vehicle drives from the first rotational information and the second rotational information.

As described above, in the driving assist system according to the aspect of this disclosure, the detection units detect the rotational information about actual rotation of the left and right wheels, and the processing unit estimates the running turning radius from the rotational information. With this configuration, the driving assist system can estimate the running turning radius, along which the vehicle actually drives, with higher accuracy, compared to a case where the running turning radius is estimated based on the steering angle or the like, which depends on characteristics of the vehicle, etc.

In the driving assist system according to the aspect of this disclosure, the processing unit may calculate a correction value for correcting a steering angle of a steering unit configured to operate a steerable wheel of the vehicle based on the running turning radius.

As described above, in the driving assist system according to the aspect of this disclosure, since the processing unit calculates the correction value based on the running turning radius estimated with higher accuracy, it is possible to allow the vehicle to drive along the set route with higher accuracy during automatic driving or the like.

In the driving assist system according to the aspect of this disclosure, the processing unit may calculate the correction value based on a provisional correction value obtained by multiplying a steering angle increase/decrease rate or an average steering angle increase/decrease rate value by a first correction coefficient, the steering angle increase/decrease rate being a ratio of a set turning radius of a set turning circle on a set route to a target point to the running turning radius, the average steering angle increase/decrease rate value being an average value of a plurality of the steering angle increase/decrease rates, the first correction coefficient being less than 1.

As described above, in the driving assist system according to the aspect of this disclosure, since the processing unit calculates the correction value by multiplying the average steering angle increase/decrease rate value by the first correction coefficient which is less than 1, it is possible to reduce the influence of an abnormal value on the correction value even when the average steering angle increase/decrease rate value or the like is the abnormal value.

In the driving assist system according to the aspect of this disclosure, the processing unit may calculate the correction value based on the provisional correction value obtained by multiplying the steering angle increase/decrease rate or the average steering angle increase/decrease rate value by a second correction coefficient when a variation in the steering angle increase/decrease rate or the average steering angle increase/decrease rate value is equal to or greater than a preset variation threshold value, the second correction coefficient being smaller than the first correction coefficient.

As described above, in the driving assist system according to the aspect of this disclosure, since the processing unit calculates the correction value by multiplying the second correction coefficient which is smaller than the first correction coefficient, when the variation in the average steering angle increase/decrease rate value or the like is large, it is possible to reduce the influence of an inappropriate average steering angle increase/decrease rate value or the like on the correction value.

In the driving assist system according to the aspect of this disclosure, the processing unit may set a start point on the running route based on a target steering angle and a detected steering angle of a steering unit, the target steering angle being associated with a set turning radius of a set turning circle on a set route to a target point, may set an end point to a point on the running route, at which the set turning circle ends, and may estimate the running turning radius based on coordinates of the start point and the end point calculated from the first rotational information and the second rotational information.

As described above, in the driving assist system according to the aspect of this disclosure, since the processing unit calculates the running turning radius based on the coordinates of the start point and the end point calculated from the actually measured rotational information, it is possible to calculate the running turning radius with high accuracy.

In the driving assist system according to the aspect of this disclosure, the processing unit may set a midpoint to a point on the running route at which an angle between a direction of the vehicle and a reference direction becomes an average angle of a start point angle and an end point angle based on the first rotational information and the second rotational information, the start point angle being an angle between the direction of the vehicle and the reference direction at the start point, the end point angle being an angle between the direction of the vehicle and the reference direction at the end point, and may estimate the running turning radius based on coordinates of the start point, the midpoint, and the end point calculated from the first rotational information and the second rotational information.

As described above, in the driving assist system according to the aspect of this disclosure, since the processing unit sets the midpoint based on the start point angle and the end point angle calculated from the rotational information, it is possible to equalize and increase the distances between the midpoint, and the start point and the end point, compared to a case where the midpoint is set based on the distance between the start point and the end point or the like. Thereby, the driving assist system may calculate the running turning radius with higher accuracy.

In the driving assist system according to the aspect of this disclosure, the processing unit may set a plurality of sub-midpoints before and after the midpoint on the running route, and may estimate the running turning radius based on a plurality of virtual running turning radii calculated from coordinates of the start point, the midpoint, the plurality of sub-midpoints, and the end point calculated from the first rotational information and the second rotational information.

As described above, in the driving assist system according to the aspect of this disclosure, since the processing unit estimates the running turning radius from the plurality of virtual running turning radii calculated from the midpoint and the plurality of sub-midpoints, it is possible to calculate the running turning radius with higher accuracy.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A driving assist system comprising:
    a first detection unit configured to detect first rotational information that is information about rotation of a left wheel of a vehicle;
    a second detection unit configured to detect second rotational information that is information about rotation of a right wheel of the vehicle; and
    a processor configured to estimate a running turning radius of a running turning circle on a running route on which the vehicle drives from the first rotational information and the second rotational information,
    wherein the processor calculates a correction value for correcting a steering angle of a steering unit configured to operate a steerable wheel of the vehicle based on the running turning radius, and
    the processor calculates the correction value based on a provisional correction value obtained by multiplying a steering angle increase/decrease rate percent or an average steering angle increase/decrease rate percent value by a first correction coefficient, the steering angle increase/decrease rate percent being a ratio of a set turning radius of a set turning circle on a set route to a target point of travel to the running turning radius, the average steering angle increase/decrease rate percent value being an average value of a plurality of the steering angle increase/decrease rate percent, the first correction coefficient being less than one.

2. The driving assist system according to claim 1, wherein the processor calculates the correction value based on the provisional correction value obtained by multiplying the steering angle increase/decrease rate percent or the average steering angle increase/decrease rate percent value by a second correction coefficient when a variation in the steering angle increase/decrease rate percent or the average steering angle increase/decrease rate percent value is equal to or greater than a preset variation threshold value, the second correction coefficient being smaller than the first correction coefficient.

3. The driving assist system according to claim 1, wherein the processor
    sets a start point on the running route based on a target steering angle and a detected steering angle of a steering unit, the target steering angle being associated with a set turning radius of a set turning circle on a set route to a target point,
    sets an end point to a point on the running route at which the set turning circle ends, and
    estimates the running turning radius based on coordinates of the start point and the end point calculated from the first rotational information and the second rotational information.

4. The driving assist system according to claim 3, wherein the processor
    sets a midpoint to a point on the running route at which an angle between a direction of the vehicle and a reference direction becomes an average angle of a start point angle and an end point angle based on the first rotational information and the second rotational information, the start point angle being an angle between the direction of the vehicle and the reference direction at the start point, the end point angle being an angle between the direction of the vehicle and the reference direction at the end point, and
    estimates the running turning radius based on coordinates of the start point, the midpoint, and the end point calculated from the first rotational information and the second rotational information.

5. The driving assist system according to claim 4, wherein the processor
    sets a plurality of sub-midpoints before and after the midpoint on the running route, and
    estimates the running turning radius based on a plurality of virtual running turning radii calculated from coordinates of the start point, the midpoint, the plurality of sub-midpoints, and the end point calculated from the first rotational information and the second rotational information.

* * * * *